Aug. 1, 1967

A. A. HUGOT 3,334,283

ELECTRIC STARTING SYSTEM FOR SYNCHRONOUS MOTORS

Filed May 25, 1965

United States Patent Office 3,334,283
Patented Aug. 1, 1967

3,334,283
ELECTRIC STARTING SYSTEM FOR SYNCHRONOUS MOTORS
André Albert Hugot, Asnieres, France, assignor to Compagnie Electro-Mecanique, Paris, France, a company of France
Filed May 25, 1965, Ser. No. 458,537
Claims priority, application France, May 27, 1964, 976,099
9 Claims. (Cl. 318—165)

This invention relates to an electric starting system for variable-speed reversible synchronous motors and enables the motor to start on load.

It is known that a synchronous motor supplied at a fixed frequency rotates at a constant speed synchronous with the speed of the rotating field produced by the A.C. flowing through the motor windings. Motors of this kind are not self-starting; to start them they must be brought by various means to substantially the speed of the rotating field, the rotor then being pulled into step therewith. The usual forms of starter comprise either an auxiliary induction or D.C. motor, or auxiliary windings to enable the motor to run temporarily as an asynchronous motor, or mechanical or resilient devices based on inertia and/or resonance.

It is an object of the invention to provide an electric starting system for starting a synchronous motor.

According to the invention, there is provided a synchronous motor electric starting system, comprising a synchronous alternator and an auxiliary synchronous motor, the rotors of said alternator and auxiliary motor being coupled together and being coupled or adapted to be coupled to the rotor of the motor to be started and the alternator output being connected to the auxiliary motor so that any movement of the rotor of the motor to be started drives the rotor of the alternator and produces therein a voltage which is supplied to the auxiliary synchronous motor whose torque is added to the torque developed by the feed current in the motor to be started and brings the rotor thereof to synchronous speed.

Features and advantages of the invention will become apparent from the following description, given by way of example only, of embodiments of the invention, reference being made to the accompanying drawings, wherein.

The drawings refer to the simplest possible case in which the three synchronous machines concerned—i.e., the mian synchronous motor, the alternator and the auxiliary synchronous motor—are heteropolar machines having a stationary armature and a field rotor, the latter taking the form of a simple permanent magnet (two-pole machines). It is also assumed that the rotors of the three machines are either rigidly connected to a single shaft or can be aligned therewith or offset therefrom. However, this form of representation, chosen solely to make the description clear, does not limit the invention in any way and the same is independent of the particular kind of construction of each machine, of its number of poles, of whether or not there is direct or indirect coupling between the machines and of the construction of the fields.

Figure 1:
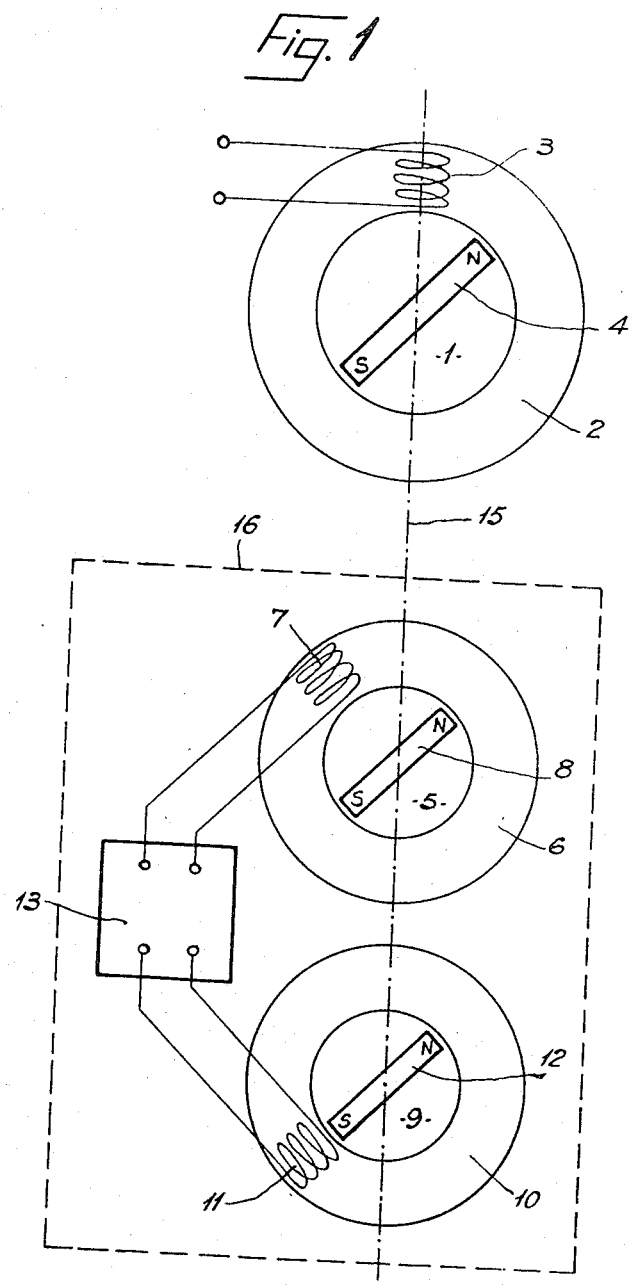
FIGURE 1 shows the underlying idea of the system according to the invention.

Referring to FIGURE 1, a main synchronous motor 1 comprises a stator member 2, a single-phase or polyphase stator winding symbolised by a winding 3, and a field rotor formed by a permanent magnet 4; an alternator 5 comprises a stator member 6, a single-phase or polyphase stator winding symbolised by a winding 7, and a field rotor formed by a permanent magnet 8; and an auxiliary synchronous motor 9 comprises a stator member 10, a single-phase or polyphase stator winding symbolised by a winding 11, and a field rotor formed by a permanent magnet 12. The stator winding 7, 11 are interconnected via any kind of known amplifier 13 supplied by a D.C. source 14 (see FIGURE 3). The alternator winding 7 is connected to the amplifier input and the auxiliary motor winding 11 is connected to the amplifier output. As is shown, the three field rotors 4, 8, 12 are rigidly connected to a common shaft 15.

The unit 16 formed by the alternator 5, auxiliary motor 9 and amplifier 13 is a unit forming part of the starting system according to the invention and can be separate from the main motor 1, since the three rotors need not necessarily be connected to the same shaft and can be interconnected by any other appropriate form of mechanical or resilient connection. The unit 16 is adapted to rotate in a predetermined direction up to a top speed which can be slightly above the synchronous speed of the main motor and is reversible. This feature enables the main motor to operate at various speeds corresponding to various supply system frequencies.

The system 1–16 hereinbefore described operates as follows, with the feature that the main motor runs up from standstill to its normal speed in two consecutive steps substantially without any break.

During the first step or stage, the fixed-frequency voltage of the supply system acts on the main motor 1. The instantaneous torque developed between the A.C. field of the stator winding 3 and the D.C. field of the field rotor 4 makes the same oscillate without starting. Since the rotor 4 is connected to the other two rotors 8, 12, all three rotors start to oscillate. Without any departure from the scope of the invention, the oscillation can be boosted by the kind of coupling used which can be inter alia resilient or electrical or magnetic and which can always be devised so that unstable equilibrium positions which may occur—although they are very unlikely to—can be passed through. Because of the oscillating movement of the rotor 8, an alternating voltage is developed in the armature winding 7 of the alternator 5 and is applied to the amplifier input circuit. This input voltage, multiplied by the amplifier multiplication factor, which is selected appropriately and is adjustable, is transmitted via the amplifier output circuit to the stator winding 11 of the auxiliary motor 9. The same develops an instantaneous torque which increases the amplitude of oscillations of the system. This effect is cumulative until all three rotors start to rotate and reach the second stage or step of the starting cycle.

The hand of rotation can be determined by providing an appropriate phase shift between the A.C. voltage applied to the auxiliary motor 9 and the voltage delivered by the alternator 5. The phase shift can be provided either mechanically—by the stators 6 and 10 being offset from one another by an appropriate angle or by the rotors 8 and 12 being offset from one another on their common shaft—or electrically at the input or output of the amplifier 13 or therein. Matters are so arranged that, for instance, a positive phase shift causes rotation in a predetermined direction and a negative phase shift causes rotation to the opposite hand. The amount of phase shift controls the top speed which the starting system can reach for a given amplification factor of the amplifier.

Once the second stage of the starting cycle has been reached and the system starts to rotate, the alternator 5 applies an A.C. input voltage to the amplifier 13 and the output voltage thereof is applied to the auxiliary motor 9. It is found in practice that speed increases and rapidly becomes equal to the speed of the rotating field of the main motor 1. If the synchronising torque thereof is greater than the torque of the starter system 16, the speed thereof is stabilized in synchronism.

Figure 3:
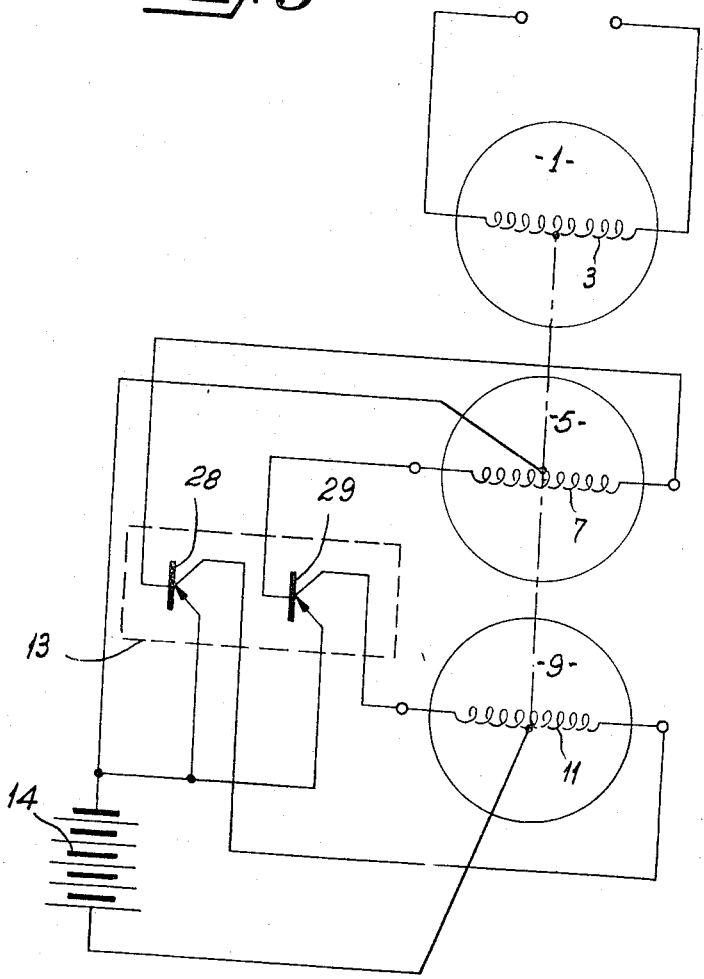
FIGURE 3 is a simplified circuit diagram for an embodiment wherein the amplifier comprises two push-pull connected transistors energised from a D.C. supply.

Referring now to FIGURE 3, an embodiment of the system just described, which is very useful at least for low-power small-size machines, is to break the system down into, on the one hand, the main motor 1, and on the other hand, the alternator 5, auxiliary motor 9, amplifier 13 and auxiliary D.C. source 14.

Figure 2:
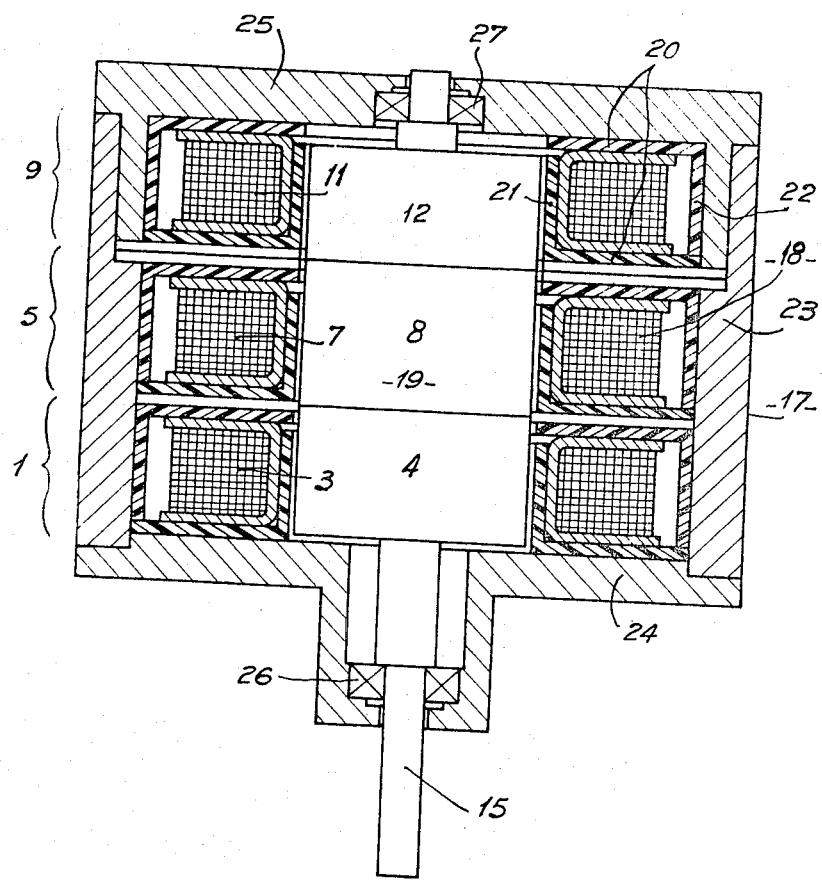
FIGURE 2 is a view in axial section through a preferred form of the system according to the invention.

As can be seen in FIGURE 2, a system 17 as actually constructed comprises just a single field rotor comprising all the permanent magnets, as 4, 8, 12, and a single stator system bearing the three windings 3, 7, 11. The rotor takes the form of a ring magnet 19 having on its periphery, for instance, 8 north poles and 8 south poles in alternate relationship. Conveniently, the magnet 19 is made of magnetised ferrite and is rigidly or resiliently connected to the common shaft 15. In this construction the stator 18 comprises three identical parts associated respectively with the main motor 1, alternator 5 and auxiliary motor 9. Each such part comprises two webs or the like 20, each pair of webs respectively extending around a main motor armature winding 3, an alternator armature winding 7 and an auxiliary motor armature winding 11. Each web 20 has 8 teeth 21 in alternate relationship on the inner periphery of the winding which for the sake of simplicity is a cylindrical winding. Each magnetic circuit thus formed is closed by a ring 22. The webs and rings are made of a soft magnetic material. These three parts, appropriately offset from one another if need be, are stacked together to form the single stator 18.

The system is received in a casing formed by a peripheral body 23 and two end members 24, 25 comprising bearings 26, 27 for the shaft 15 for the field system—i.e., the magnets 4, 8, 12. In this system the end member 25 driving the armature 11 can rotate relatively to the armature 7 for adjusting the required phase shift between the alternator 5 and the auxiliary motor 9. The armature 11 can be locked after the phase shift has been adjusted.

The main synchronous motor 1 is supplied by an external system whose fixed frequency can be from a few cycles to several hundred cycles per second.

As FIGURE 3 shows, the amplifier 13 supplied by the auxiliary source 14 comprises two push-pull connected transistors 28, 29. As already mentioned, the auxiliary source 14 can be included in the amplifier.

The invention, which comprises three synchronous machines, is of use whatever the kind of construction, number of phases and number of poles of the machines, since these parameters are of no importance in the description just given of how the invention operates. The three machines need not even be similar to one another, for a polyphase main motor 1 can be coupled with a starter system 16 (FIGURE 1) comprising only single-phase elements. Of course, the starting system according to the invention can, occasionally, with advantage, be disconnected from the main motor after the same has started, and this step can be performed by any known means such as a magnetic clutch or a device responsive to the speed of rotation.

The system according to the invention is of use in all cases where it is required to start a synchronous motor on load and/or to obtain a number of synchronous speeds or a change from one synchronous speed to another. The system is very suitable, for instance, for driving recording equipment, including echo-sounding recorders which use speeds such as 375, 750 and 1500 r.p.m., for ready starting and change-over between the synchronous speeds can be provided just by an abrupt change-over of the supply frequency of the main motor.

The embodiments hereinbefore described can of course be varied, inter alia by the substitution of equivalent technical means, without departing from the scope of the invention as defined in the claims.

What I claim is:

1. A synchronous motor starting system comprising, in combination:
   a first, main, synchronous motor which is to be started, said first synchronous motor having stator field winding means and a rotor;
   a synchronous alternator having stator output winding means and a rotor;
   a second, auxiliary, synchronous motor having stator field winding means and a rotor;
   means coupling together the rotors of said first and second synchronous motors and said synchronous alternator; and
   means electrically connecting the stator output winding of said synchronous alternator to the stator field winding means of said second synchronous motor.

2. A synchronous motor starting system comprising, in combination:
   a first, main, synchronous motor which is to be started, said first synchronous motor being of the heteropolar kind having stator field winding means and a rotatably mounted permanent magnet forming a rotor;
   a synchronous alternator of the heteropolar kind having stator output winding means and a rotatably mounted permanent magnet forming a rotor;
   a second, auxiliary, synchronous motor of the heteropolar kind having stator field winding means and a rotatably mounted permanent magnet forming a rotor;
   means coupling together the rotors of said first and second synchronous motors and said synchronous alternator; and
   means electrically connecting the stator output winding of said synchronous alternator to the stator field winding means of said second synchronous motor.

3. A synchronous motor starting system comprising, in combination:
   a rotatably mounted shaft;
   a first, main, synchronous motor which is to be started, said first synchronous motor having stator field winding means and a rotor, said first motor rotor being secured on and rotatable with said shaft;
   a synchronous alternator having stator output winding means and a rotor, said alternator rotor being secured on and rotatable with said shaft;
   a second, auxiliary, synchronous motor having stator field winding means and a rotor, said second motor rotor being secured on and rotatable with said shaft;
   means electrically connecting the stator output winding of said synchronous alternator to the stator field winding means of said second synchronous motor for the alternator to supply alternating excitation to said second synchronous motor; and
   means to vary the effective phase angle relative to each other of the alternator output and the excitation of said second synchronous motor.

4. A synchronous motor starting system comprising, in combination: a rotatably mounted shaft;
   a first, main, synchronous motor which is to be started, said first synchronous motor having stator field winding means and a rotor, said first motor rotor being secured on and rotatable with said shaft;
   a synchronous alternator having stator output winding means and a rotor, said alternator rotor being mounted on said shaft;
   a second, auxiliary, synchronous motor having stator field winding means and a rotor, said second motor rotor being mounted on said shaft;
   means electrically connecting the stator output winding of said synchronous alternator to the stator field winding means of said second synchronous motor; and
   two means securing the rotors of said alternator and said second synchronous motor on said shaft for rotation therewith, at least one of said securing means being adjustable to vary the rotational position of the respective rotor on said shaft.

5. A synchronous motor starting system comprising, in combination:

a first, main, synchronous motor which is to be started, said first synchronous motor having stator field winding means and a rotor;

a synchronous alternator having stator output winding means and a rotor;

a second, auxiliary, synchronous motor having stator field winding means and a rator;

means coupling together the rotors of said first and second synchronous motors and said synchronous alternator;

means electrically connecting the stator output winding of said synchronous alternator to the stator field winding means of said second synchronous motor; and adjustable support means supporting the stator output winding means of said alternator and the stator field winding means of said second synchronous motor whereby one is adjustably rotatable with respect to the other.

6. A synchronous motor starting system comprising, in combination:

a first, main, synchronous motor which is to be started, said first synchronous motor having stator field winding means and a rotor;

a synchronous alternator having stator output winding means and a rotor;

a second, auxiliary, synchronous motor having stator field winding means and a rotor;

means coupling together the rotors of said first and second synchronous motors and said synchronous alternator;

electric amplifier means having an input and an output;

means electrically connecting the stator output winding of said synchronous alternator to the input of said electric amplifier means; and means electrically connecting the output of said electric amplifier means to the stator field winding of said second synchronous motor, 7. A synchronous motor starting system comprising, in combination:

a first, main, synchronous motor which is to be started, said first synchronous motor having stator field winding means and a rotor;

a synchronous alternator having stator output winding means and a rotor;

a second, auxiliary, synchronous motor having stator field winding means and a rotor;

means coupling together the rotors of said first and second synchronous motors and said synchronous alternator;

electric amplifier means comprising two transistors each having a base electrode and a collector electrode;

means electrically connecting the stator output winding of said synchronous alternator to the base electrodes of said transistors; and means electrically connecting the collector electrodes of said transistors to the stator field winding of said second synchronous motor.

8. A synchronous motor starting system comprising, in combination:

a first, main, synchronous motor which is to be started, said first synchronous motor having stator field winding means and a rotor;

a synchronous alternator having stator output winding means and a rotor;

a second, auxiliary, synchronous motor having stator field winding means and a rotor;

means coupling together the rotors of said first and second synchronous motors and said synchronous alternator;

electric amplifier means having an input, an output and variable phase shift means to vary the phase of the output from the amplifier means relative to the input thereto;

means electrically connecting the stator output winding of said synchronous alternator, to the input of said electric amplifier means; and means electrically connecting the output of said electric amplifier means to the stator field winding of said second synchronous motor.

9. A synchronous motor unit comprising, in combination:

a housing;

a shaft rotatably mounted in said housing;

a first, main, synchronous motor which is to be started mounted within said housing, said first synchronous motor having stator field winding means and a rotor, said first motor rotor being secured on and rotatable with said shaft; and a starting system for said first motor, said starting system comprising a synchronous alternator mounted within said housing and having stator output winding means and a rotor, said alternator rotor being secured on and rotatable with said shaft;

a second, auxiliary, synchronous motor mounted within said housing and having stator field winding means and a rotor, said second motor rotor being secured on and rotatable with said shaft; and means electrically connecting the stator output winding of said synchronous alternator to the stator field winding means of said second synchronous motor.

References Cited
UNITED STATES PATENTS

| | | | |
|---|---|---|---|
| 2,993,159 | 7/1961 | Devol | 310—156 X |
| 3,091,728 | 5/1963 | Hogan et al. | 318—138 |

OTHER REFERENCES

German application 1,149,447, May 30, 1963.

ORIS L. RADER, *Primary Examiner.*

G. Z. RUBINSON, *Assistant Examiner.*